United States Patent
Wei et al.

(10) Patent No.: US 12,254,100 B2
(45) Date of Patent: Mar. 18, 2025

(54) DATA SECURITY REALIZATION METHOD AND SYSTEM BASED ON K-DB DATABASE, AND STORAGE MEDIUM

(71) Applicant: INSPUR SUZHOU INTELLIGENT TECHNOLOGY CO., LTD., Jiangsu (CN)

(72) Inventors: Benshuai Wei, Jiangsu (CN); Yankui Du, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 204 days.

(21) Appl. No.: 18/010,267

(22) PCT Filed: Feb. 19, 2021

(86) PCT No.: PCT/CN2021/076801
§ 371 (c)(1),
(2) Date: Dec. 14, 2022

(87) PCT Pub. No.: WO2021/253850
PCT Pub. Date: Dec. 23, 2021

(65) Prior Publication Data
US 2023/0297692 A1    Sep. 21, 2023

(30) Foreign Application Priority Data
Jun. 14, 2020 (CN) .......................... 202010539424.0

(51) Int. Cl.
*G06F 21/60* (2013.01)
*G06F 16/22* (2019.01)
*G06F 21/62* (2013.01)

(52) U.S. Cl.
CPC ........ *G06F 21/602* (2013.01); *G06F 16/2255* (2019.01); *G06F 21/6218* (2013.01)

(58) Field of Classification Search
None
See application file for complete search history.

(56) References Cited

U.S. PATENT DOCUMENTS

| 10,303,691 B2 | 5/2019 | Wu et al. |
| 2011/0009133 A1* | 1/2011 | Hung ................. H04L 67/04 455/466 |

(Continued)

FOREIGN PATENT DOCUMENTS

| CN | 103345521 A | 10/2013 |
| CN | 103685162 A | 3/2014 |

(Continued)

OTHER PUBLICATIONS

Search report for international application No. PCT/CN2021/076801 mailed on May 17, 2021.

(Continued)

*Primary Examiner* — Raqiul A Choudhury
(74) *Attorney, Agent, or Firm* — Dennemeyer & Associates LLC (57) ABSTRACT

A data security realization method and system based on a K-DB database are provided. The method includes: receiving a data processing request of a user regarding a data table in a database; in a case where the data processing request is a data insertion action request regarding the data table, successively executing hash and encryption actions on inserted data, and storing encrypted data in an encrypted permanent hash table; and in a case where the data processing request is a data modification action regarding the data table or a data deletion action regarding the data table, generating an instruction for prohibiting data modification or data deletion. By virtue of the solution, the flow of prohibiting data modification and data deletion regarding a data (Continued)

table is optimized, and a hash value is encrypted, so that the function is more secure and strong.

14 Claims, 6 Drawing Sheets

(56) References Cited

U.S. PATENT DOCUMENTS

| | | | | |
|---|---|---|---|---|
| 2011/0067084 A1* | 3/2011 | Byun | .................... | G06F 16/217 |
| | | | | 726/4 |
| 2014/0359291 A1* | 12/2014 | Wilson | .................... | G06Q 10/10 |
| | | | | 713/168 |
| 2016/0283749 A1* | 9/2016 | Yoon | .................... | H04L 9/0872 |
| 2017/0075902 A1* | 3/2017 | Hoffner | ................ | G06F 16/252 |
| 2018/0227119 A1* | 8/2018 | Bibera | .................... | G06F 16/21 |
| 2019/0026042 A1 | 1/2019 | Gupta et al. | | |

FOREIGN PATENT DOCUMENTS

| | | |
|---|---|---|
| CN | 106022154 A | 10/2016 |
| CN | 107169055 A | 9/2017 |
| CN | 111859445 A | 10/2020 |

OTHER PUBLICATIONS

Chinese Office Action and search report for application No. 202010539424.0.

\* cited by examiner

DATA SECURITY REALIZATION METHOD AND SYSTEM BASED ON K-DB DATABASE, AND STORAGE MEDIUM

CROSS-REFERENCE TO RELATED APPLICATION

The present application is an International Stage Filing of the PCT International Application No. PCT/CN2021/076801 filed on Feb. 19, 2021, which claims priority to Chinese Patent Application No. 202010539424.0, filed on Jun. 14, 2020 and entitled "Data Security Realization Method and System Based on K-DB Database", the disclosure of which is hereby incorporated by reference in its entirety.

TECHNICAL FIELD

The present disclosure relates to the technical field of data security, in particular to a data security realization method and system based on a K-DB database, and a non-transitory computer-readable storage medium.

BACKGROUND

A Database (for example, a K-DB database), which may be simply regarded as an electronic filing cabinet, is a place where electronic files are stored, and users may perform operations such as adding, intercepting, updating and deleting data in the files. The "database" is a collection of data that is stored together in some ways, shared by a plurality of users, with as little redundancy as possible, and independent of an application. The database consists of a plurality of Tablespaces.

At present, a technology of prohibiting modification and deletion of data in the database has been implemented, but there are still some problems in this technology, such as the need to implement with the help of some software or technologies from a third party, the lack of encryption on a core table, and a risk of being cracked after encryption.

SUMMARY

In view of the defects in the related art, embodiments of the present disclosure provide a data security realization method based on a K-DB database, and a non-transitory computer-readable storage medium, which may solve the problem of security risks of the database in the related art.

The technical solutions provided by the embodiments of the present disclosure are described as follows. A data security realization method based on a K-DB database max include the following operations.

A data processing request of a user regarding a data table in a database is received, wherein the data processing request regarding the data table includes a data insertion action request regarding the data table, a data modification action request regarding the data table, and a data deletion action request regarding the data table.

In a case where the data processing request is a data insertion action request regarding the data table, hash and encryption actions are successively executed on inserted data, and encrypted data is stored in an encrypted permanent hash table.

In a case where the data processing request is a data modification action request regarding the data table or a data deletion action request regarding the data table, an instruction for prohibiting data modification or data deletion is generated.

As an improved solution, successively executing, in a case where the data processing request is a data insertion action request regarding the data table, hash and encryption actions on inserted data, and storing encrypted data in an encrypted permanent hash table may include the following operations.

Hash calculation is performed on the inserted data, and a hash value obtained by the hash calculation is stored in a permanent hash table.

Security attribute identification calculation is performed on the hash value obtained by the hash calculation, a time stamp value is appended after the hash value, an encrypted hash value is generated, and the encrypted hash value is stored in the encrypted permanent hash table.

As an improved solution, performing hash calculation on the inserted data and storing a hash value obtained by the hash calculation in a permanent hash table may include the following operations.

Hash values of data elements of the data table are successively calculated. Herein, the data elements of the data table may include a database name, a user name, a table, a row Identifier (ID), a field name, a field value and an insertion time.

Hash calculation is performed on an entirety of the data elements of the data table after the hash calculation to obtain a hash value corresponding to the inserted data.

The hash value obtained by the hash calculation is stored in the permanent hash table.

As an improved solution, generating, in a case where the data processing request is a data modification action request regarding the data table, an instruction for prohibiting data modification may include the following operations.

Hash values of data elements of the data table are successively calculated. Herein, the data elements of the data table may include a database name, a user name, a table, a row ID, a field name, a field value and a modification time.

Hash calculation is performed on an entirety of the data elements of the data table after the hash calculation to obtain a hash value corresponding to modified data, and the hash value corresponding to modified data is stored in a temporary hash table.

A row position of the modified data in the data table is determined, and a hash value at the determined row position in the encrypted permanent hash table is decrypted to obtain a permanent hash value.

The hash value stored in the temporary hash table is compared with the permanent hash value obtained by decryption, and whether the hash value stored in the temporary hash table is consistent with the permanent hash value obtained by decryption is determined.

In a case where it is determined that the hash value stored in the temporary hash table is consistent with the permanent hash value obtained by decryption, the instruction for prohibiting data modification is generated.

In a case where it is determined that the hash value stored in the temporary hash table is not consistent with the permanent hash value obtained by decryption; the instruction for prohibiting data modification is also generated.

As an improved solution, generating, in a case where the data processing request is a data deletion action request regarding the data table, an instruction for prohibiting data deletion may include the following operations.

Hash values of data elements of the data table are successively calculated. Herein, the data elements of the data table may include a database name, a user name, a table, a row ID, a field name, a field value and a deletion time.

Hash calculation is performed on an entirety of the data elements of the data table after the hash calculation to obtain a hash value corresponding to deleted data, and the hash value corresponding to the deleted data is stored in the temporary hash table. Herein, the hash value obtained by the hash calculation is null.

A position of the deleted data in the data table is determined, and a hash value at the determined position in the encrypted permanent hash table is decrypted to obtain a permanent hash value.

The hash value stored in the temporary hash table is compared with the permanent hash value obtained by decryption.

The instruction for prohibiting data deletion is generated according to a comparison result.

A data security realization system based on a K-DB database is provided, which may include: a data processing request receiving module, a data insertion action execution module and a modification and deletion action execution module.

The data processing request receiving module may be configured to receive a data processing request of a user regarding a data table in a database, wherein the data processing request regarding the data table includes a data insertion action request regarding the data table, a data modification action request regarding the data table, and a data deletion action request regarding the data table.

The data insertion action execution module may be configured to successively execute, in a case where the data processing request is a data insertion action request regarding the data table, hash and encryption actions on inserted data, and store encrypted data in an encrypted permanent hash table.

The modification and deletion action execution module may be configured to generate, in a case where the data processing request is a data modification action request regarding the data table or a data deletion action request regarding the data table, an instruction for prohibiting data modification or data deletion.

As an improved solution, the data insertion action execution module may include: a hash calculation module and an encryption module.

The hash calculation module may be configured to perform hash calculation on the inserted data, and store a hash value obtained by the hash calculation in a permanent hash table.

The encryption module may be configured to perform security attribute identification calculation on the hash value obtained by the hash calculation, append a time stamp value after the hash value, generate an encrypted hash value, and store the encrypted hash value in the encrypted permanent hash table.

As an improved solution, the hash calculation module may include: a first hash calculation module, a second hash calculation module and a storage module.

The first hash calculation module may be configured to successively calculate hash values of data elements of the data table. As an improved solution, the data elements of the data table may include a database name, a user name, a table, a row ID, a field name, a field value and an insertion time.

The second hash calculation module may be configured to perform hash calculation on an entirety of the data elements of the data table after the hash calculation to obtain a hash value corresponding to the inserted data.

The storage module may be configured to store the hash value obtained by the hash calculation in the permanent hash table.

As an improved solution, the data modification and deletion execution module may include: a third hash calculation module, a fourth hash calculation module, a first position determining module, a first decryption module, a first comparison and determination module, a first modification prohibition instruction module and a second modification prohibition instruction module.

The third hash calculation module may be configured to successively calculate hash values of data elements of the data table. As an improved solution, the data elements of the data table may include a database name, a user name, a table, a row ID, a field name, a field value and a modification time.

The fourth hash calculation module may be configured to perform hash calculation on an entirety of the data elements of the data table after the hash calculation to obtain a hash value corresponding to modified data, and store the hash value corresponding to the modified data in a temporary hash table.

The first position determining module may be configured to determine a row position of the modified data in the data table.

The first decryption module may be configured to decrypt a hash value at the determined row position in the encrypted permanent hash table to obtain a permanent hash value.

The first comparison and determination module may be configured to compare the hash value stored in the temporary hash table with the permanent hash value obtained by decryption, and determine whether the hash value stored in the temporary hash table is consistent with the permanent hash value obtained by decryption.

The first modification prohibition instruction module may be configured to generate, in a case where it is determined that the hash value stored in the temporary hash table is consistent with the permanent hash value obtained by decryption, the instruction for prohibiting data modification.

The second modification prohibition instruction module may be configured to also generate, in a case where it is determined that the hash value stored in the temporary hash table is not consistent with the permanent hash value obtained by decryption; the instruction for prohibiting data modification.

As an improved solution, the data modification and deletion execution module may include: a fifth hash calculation module, a sixth hash calculation module, a second position determining module, a second decryption module, a second comparison and determination module and a deletion prohibition instruction generation module.

The fifth hash calculation module may be configured to successively calculate hash values of data elements of the data table. As an improved solution, the data elements of the data table may include a database name, a user name, a table, a row ID, a field name, a field value and a deletion time.

The sixth hash calculation module may be configured to perform hash calculation on an entirety of the data elements of the data table after the hash calculation to obtain a hash value corresponding to deleted data, and store the hash value corresponding to the deleted data in the temporary hash table. Herein, the hash value obtained by the hash calculation is null.

The second position determining module may be configured to determine a position of the deleted data in the data table.

The second decryption module may be configured to decrypt a hash value at the determined position in the encrypted permanent hash table to obtain a permanent hash value.

The second comparison and determination module may be configured to compare the hash value stored in the temporary hash table with the permanent hash value obtained by decryption.

The deletion prohibition instruction generation module may be configured to generate the instruction for prohibiting data deletion according to a comparison result.

A computer device is provided, which may include: at least one processor; and a memory storing a computer instruction executable on the at least one processor, wherein the computer instruction, when being executed by the at least one processor, implements operations of the method in the above embodiments.

A non-transitory computer-readable storage medium is provided, which stores a computer program, wherein the computer program, when being executed by at least one processor, causes the at least one processor to implement operations of the method in the above embodiments.

In the embodiments of the present disclosure, the data processing request of the user regarding the data table in the database is received; in a case where the data processing request is the data insertion action request regarding the data table, hash and encryption actions are successively executed on the inserted data, and the encrypted data is stored in the encrypted permanent hash table; in a case where the data processing request is a data modification action request regarding the data table or a data deletion action request regarding the data table, the instruction for prohibiting data modification or data deletion is generated. Therefore, the flow of prohibiting data modification and data deletion regarding the data table is optimized, and a hash value is encrypted, so that the function is more secure and strong.

BRIEF DESCRIPTION OF THE DRAWINGS

In order to more clearly illustrate the exemplary implementation of the disclosure or the technical solutions in the related art, the drawings used in the description of the exemplary implementation or the related art will be briefly described below. In all drawings, similar elements or parts are generally identified by similar reference signs. In the drawings, the elements or parts may not necessarily be drawn to scale.

DETAILED DESCRIPTION OF THE EMBODIMENTS

The embodiments of the present disclosure will further be described below in detail in combination with the drawings. The following embodiments are only intended to more clearly illustrate the present disclosure and the technical solutions, and therefore are only intended as examples and are not intended to limit the scope of protection of the present disclosure.

Figure 1:
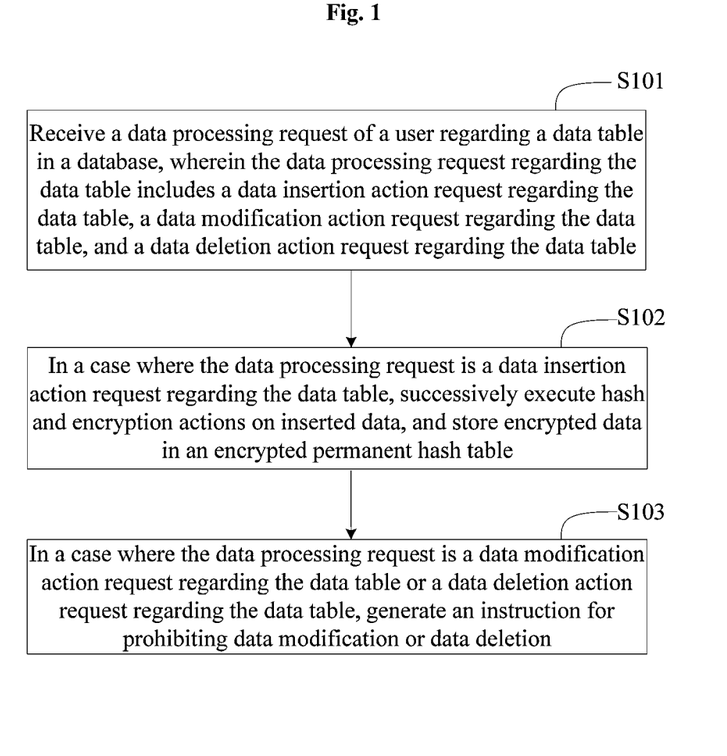
FIG. 1 is an implementation flowchart of a data security realization method based on a K-DB database according to an embodiment of the present disclosure.

FIG. 1 is an implementation flowchart of a data security realization method based on a. K-DB database according to an embodiment of the present disclosure, which includes the following operations.

In S101, a data processing request of a user regarding a data table in a database is received; wherein the data processing request regarding the data table includes a data insertion action request regarding the data table, a data modification action request regarding the data table; and a data deletion action request regarding the data table.

In S102, in a case where the data processing request is a data insertion action request regarding the data table, hash and encryption actions are successively executed on inserted data, and encrypted data is stored in an encrypted permanent hash table.

In S103, in a case where the data processing request is a data modification action request regarding the data table or a data deletion action request regarding the data table, an instruction for prohibiting data modification or data deletion is generated.

Figure 2:
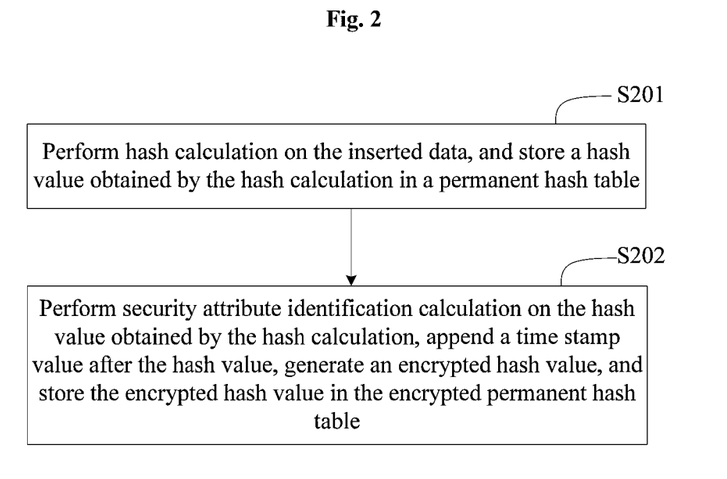
FIG. 2 is an implementation flowchart of successively executing, in a case where a data processing request is a data insertion action request regarding a data table, hash and encryption actions on inserted data, and storing encrypted data in an encrypted permanent hash table according to an embodiment of the present disclosure.

In some embodiments, as shown in FIG. 2, successively executing, in a case where the data processing request is a data insertion action request regarding the data table, hash and encryption actions on inserted data, and storing encrypted data in an encrypted permanent hash table includes the following operations.

In S201, hash calculation is performed on the inserted data, and a hash value obtained by the hash calculation is stored in a permanent hash table.

In S202, security attribute identification calculation is performed on the hash value obtained by the hash calculation, a time stamp value is appended after the hash value, an encrypted hash value is generated, and the encrypted hash value is stored in the encrypted permanent hash table.

Figure 3:
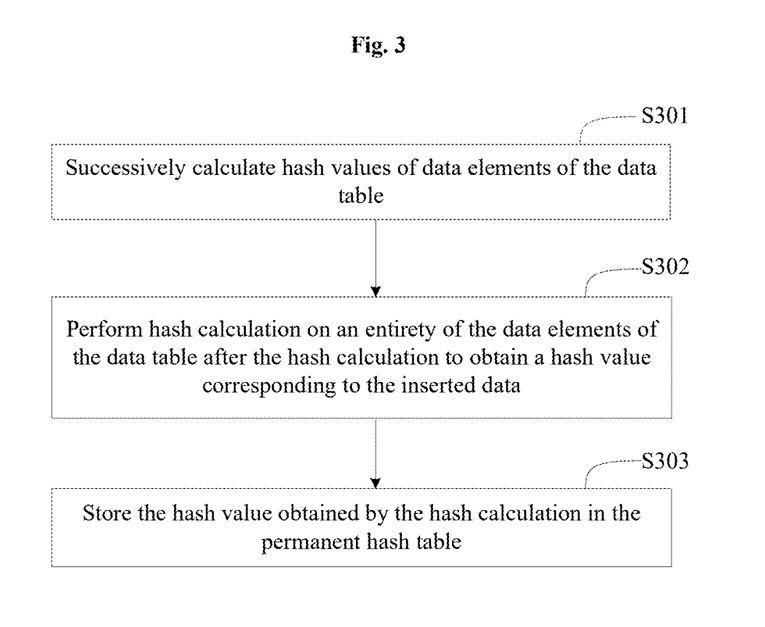
FIG. 3 is an implementation flowchart of performing hash calculation on inserted data and storing a hash value obtained by the hash calculation in a permanent hash table according to an embodiment of the present disclosure.

In some embodiments, as shown in FIG. 3, performing hash calculation on the inserted data and storing a hash value obtained by the hash calculation in a permanent hash table includes the following operations.

In S301, hash values of data elements of the data table are successively calculated. Herein, the data elements of the data table may include a database name, a user name, a table, a row ID, a field name, a field value and an insertion time.

In S302 hash calculation is performed on an entirety of the data elements of the data table after the hash calculation to obtain a hash value corresponding to the inserted data.

In S303, the hash value obtained by the hash calculation is stored in the permanent hash table.

Figure 4:
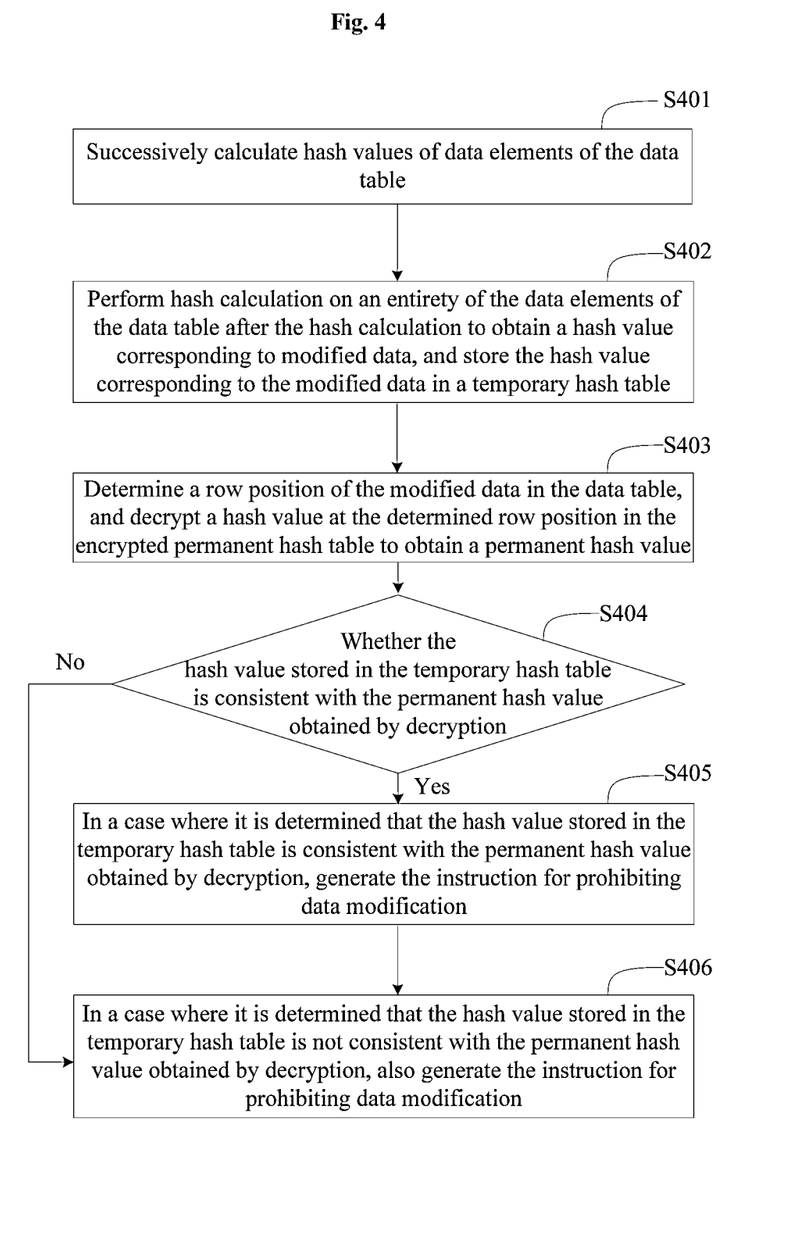
FIG. 4 is an implementation flowchart of generating, in a case where the data processing request is a data modification action regarding a data table or a data deletion action regarding the data table; an instruction for prohibiting data modification or data deletion according to an embodiment I of the present disclosure.

In some embodiments, as shown in FIG. 4, generating, in a case where the data processing request is a data modification action request regarding the data table or a data deletion action request regarding the data table, an instruction for prohibiting data modification or data deletion includes the following operations.

In S401, hash values of data elements of the data table are successively calculated. Herein, the data elements of the data table include a database name, a user name, a table, a row ID, a field name, a field value and a modification time.

In S402, hash calculation is performed on an entirety of the data elements of the data table after the hash calculation to obtain a hash value corresponding to the inserted data, and the hash value corresponding to the inserted data is stored in a temporary hash table.

In S403, a row position of modified data in the data table is determined, and a hash value at the determined row position in the encrypted permanent hash table is decrypted to obtain a permanent hash value.

In S404, the hash value stored in the temporary hash table is compared with the permanent hash value obtained by decryption, and whether the hash value stored in the temporary hash table is consistent with the permanent hash value obtained by decryption is determined, if yes, S405 is executed, otherwise S406 is executed.

In S405, in a case where it is determined that the hash value stored in the temporary hash table is consistent with the permanent hash value obtained by decryption, the instruction for prohibiting data modification is generated.

In S406, in a case where it is determined that the hash value stored in the temporary hash table is not consistent with the permanent hash value obtained by decryption, the instruction for prohibiting data modification is also generated.

Figure 5:
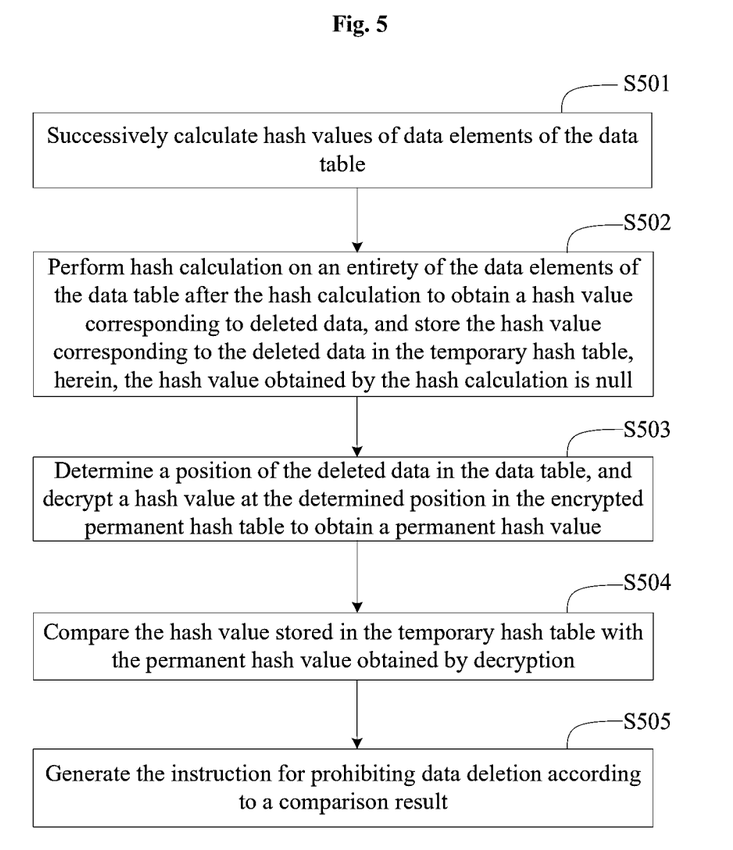
FIG. 5 is an implementation flowchart of generating, in a case where the data processing request is a data modification action regarding a data table or a data deletion action regarding the data table, an instruction for prohibiting data modification or data deletion according to an embodiment II of the present disclosure.

In some embodiments, as shown in FIG. 5, generating, in a case where the data processing request is a data modification action request regarding the data table or a data deletion action request regarding the data table, an instruction for prohibiting data modification or data deletion includes the following operations.

In S501, hash values of data elements of the data table are successively calculated. Herein, the data elements of the data table include a database name, a user name, a table, a row ID, a field name, a field value and a deletion time.

In S502, hash calculation is performed on an entirety of the data elements of the data table after the hash calculation to obtain a hash value corresponding to the inserted data, and the hash value corresponding to the inserted data is stored in the temporary hash table. Herein, the hash value obtained by the hash calculation is null.

In S503, a position of deleted data in the data table is determined, and a hash value at the determined position in the encrypted permanent hash table is decrypted to obtain a permanent hash value.

In S504, the hash value stored in the temporary hash table is compared with the permanent hash value obtained by decryption.

In S505, the instruction for prohibiting data deletion is generated according to a comparison result.

In the embodiments of the present disclosure, the flow of prohibiting data modification and data deletion regarding data is respectively optimized through the algorithms and technologies of hash; encryption and trigger of the K-DB database. At the same time, the hash value is encrypted to make the function more secure and firmer.

Figure 6:
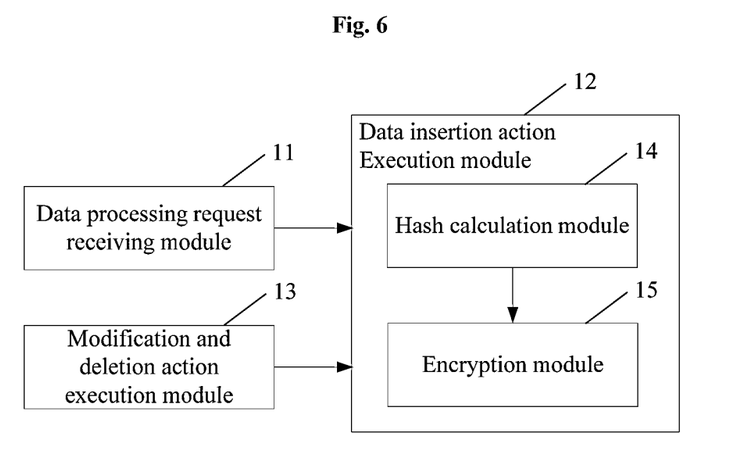
FIG. 6 is a structure diagram of a data security realization system based on a K-DB database according to an embodiment of the present disclosure.

FIG. 6 shows a structure diagram of a data security realization system based on a K-DB database according to an embodiment of the present disclosure. For ease of illustration, only the parts relevant to the embodiment of the present disclosure are shown in FIG. 6.

A data security realization system based on a K-DB database includes: a data processing request receiving module 11, a data insertion action execution module 12 and a modification and deletion action execution module 13.

The data processing request receiving module 11 is configured to receive a data processing request of a user regarding a data table in a database, wherein the data processing request regarding the data table includes a data insertion action request regarding the data table, a data modification action request regarding the data table, and a data deletion action request regarding the data table.

The data insertion action execution module 12 is configured to successively execute, in a case where the data processing request is a data insertion action request regarding the data table, hash and encryption actions on inserted data, and store encrypted data in an encrypted permanent hash table.

The modification and deletion action execution module 13 is configured to generate, in a case where the data processing request is a data modification action request regarding the data table or a data deletion action request regarding the data table, an instruction for prohibiting data modification or data deletion.

Herein, the data insertion action execution module 12 includes: a hash calculation module 14 and an encryption module 15.

The hash calculation module 14 is configured to perform hash calculation on the inserted data, and store a hash value obtained by the hash calculation in a permanent hash table.

The encryption module 15 is configured to perform security attribute identification calculation on the hash value obtained by the hash calculation, append a time stamp value after the hash value, generate an encrypted hash value, and store the encrypted hash value in the encrypted permanent hash table.

Figure 7:
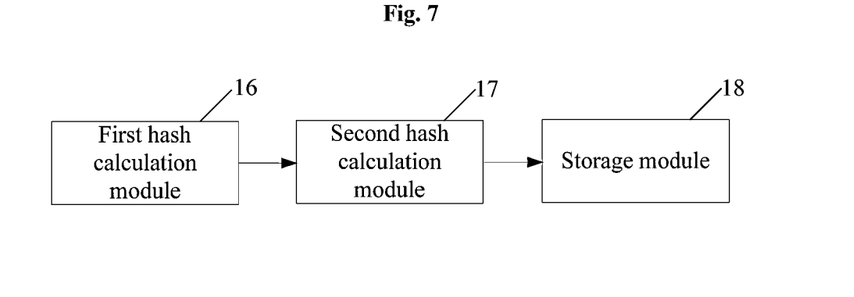
FIG. 7 is a structure diagram of a hash calculation module according to an embodiment of the present disclosure.

As shown in FIG. 7, the hash calculation module 14 includes: a first hash calculation module 16, a second hash calculation module 17 and a storage module 18.

The first hash calculation module 16 is configured to successively calculate hash values of data elements of the data table. Herein, the data elements of the data table include a database name, a user name, a table, a row ID, a field name, a field value and an insertion time.

The second hash calculation module 17 is configured to perform hash calculation on an entirety of the data elements of the data table after the hash calculation to obtain a hash value corresponding to the inserted data.

The storage module 18 is configured to store the hash value obtained by the hash calculation in the permanent hash table.

Figure 8:
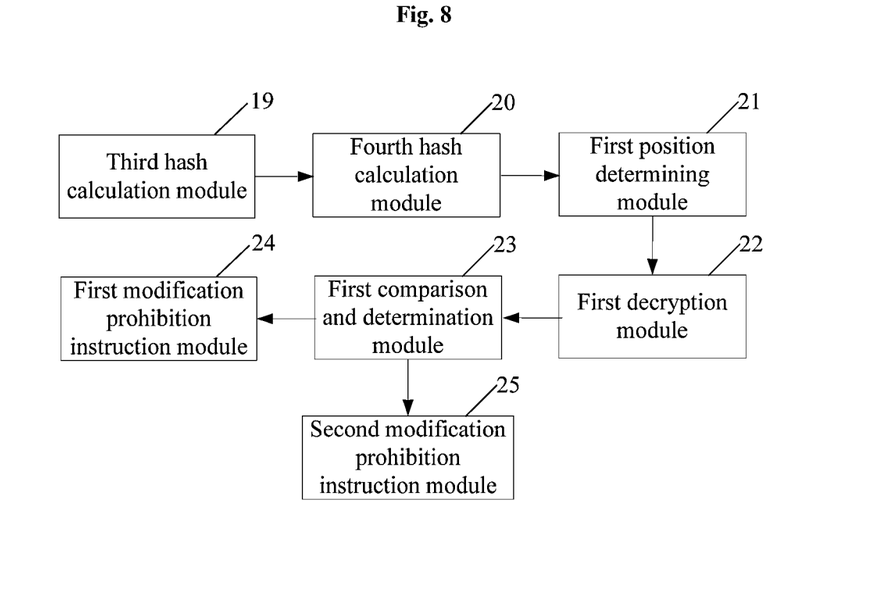
FIG. 8 is a structure diagram of a modification and deletion action execution module according to an embodiment I of the present disclosure.

As shown in FIG. 8, the data modification and deletion execution module 13 includes: a third hash calculation module 19, a fourth hash calculation module 20, a first position determining module 21 a first decryption module 22, a first comparison and determination module 23, a first modification prohibition instruction module 24 and a second modification prohibition instruction module 25.

The third hash calculation module 19 is configured to successively calculate hash values of data elements of the data table. Herein, the data elements of the data table include a database name, a user name, a table, a row ID, a field name, a field value and a modification time.

The fourth hash calculation module 20 is configured to perform hash calculation on an entirety of the data elements of the data table after the hash calculation to obtain a hash value corresponding to the inserted data, and store the hash value corresponding to the inserted data in a temporary hash table.

The first position determining module 21 is configured to determine a row position of modified data in the data table.

The first decryption module 22 is configured to decrypt a hash value at the determined row position in the encrypted permanent hash table to obtain a permanent hash value.

The first comparison and determination module 23 is configured to compare the hash value stored in the temporary hash table with the permanent hash value obtained by decryption, and determine whether the hash value stored in the temporary hash table is consistent with the permanent hash value obtained by decryption.

The first modification prohibition instruction module 24 is configured to generate; in a case where it is determined that the hash value stored in the temporary hash table is consistent with the permanent hash value obtained by decryption, the instruction for prohibiting data modification.

The second modification prohibition instruction module 25 is configured to also generate, in a case where it is determined that the hash value stored in the temporary hash table is not consistent with the permanent hash value obtained by decryption, the instruction for prohibiting data modification.

Figure 9:
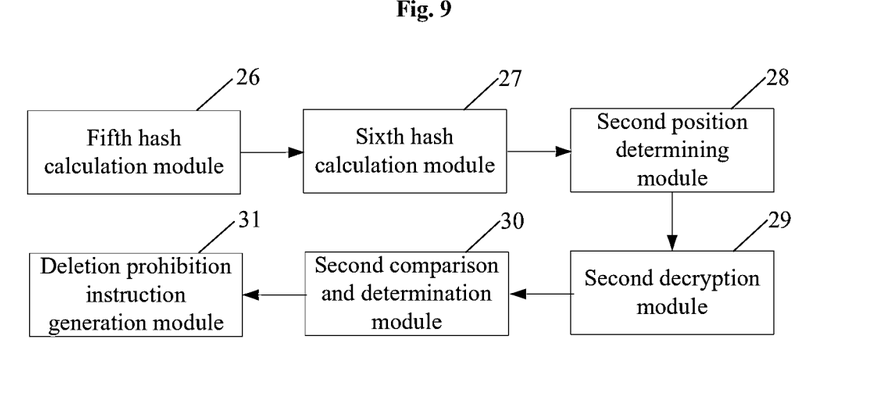
FIG. 9 is a structure diagram of a modification and deletion action execution module according to an embodiment II of the present disclosure.

As shown in FIG. 9, the data modification and deletion execution module 13 includes: a fifth hash calculation module 26, a sixth hash calculation module 17, a second position determining module 18, a second decryption module 29, a second comparison and determination module 30 and a deletion prohibition instruction generation module 31.

The fifth hash calculation module 26 is configured to successively calculate hash values of data elements of the data table. Herein, the data elements of the data table include a database name, a user name, a table, a row ID, a field name, a field value and a deletion time.

The sixth hash calculation module 27 is configured to perform hash calculation on an entirely of the data elements of the data table after the hash calculation to obtain a hash value corresponding to the inserted data, and store the hash value corresponding to the inserted data in the temporary hash table. Herein, the hash value obtained by the hash calculation is null.

The second position determining module 28 is configured to determine a position of deleted data in the data table.

The second decryption module 29 is configured to decrypt a hash value at the determined position in the encrypted permanent hash table to obtain a permanent hash value.

The second comparison and determination module 30 is configured to compare the hash value stored in the tempo-rary hash table with the permanent hash value obtained by decryption.

The deletion prohibition instruction generation module 31 is configured to generate the instruction for prohibiting data deletion according to a comparison result.

Figure 10:
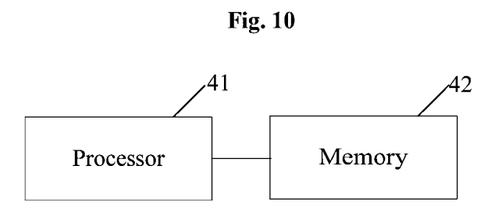
FIG. 10 is a structure diagram of a computer device according to an embodiment of the present disclosure.

FIG. 10 is a structure diagram of a computer device according to an embodiment of the present disclosure. As shown in FIG. 10, the computer device may include: at least one processor 41 (only one is shown in FIG. 10): and a memory 42 storing a computer instruction executable on the at least one processor 41, wherein the computer instruction, when being executed by the at least one processor 41, causes the at least one processor 41 to:

receive a data processing request of a user regarding a data table in a database, wherein the data processing request regarding the data table comprises a data insertion action request regarding the data table, a data modification action request regarding the data table, and a data deletion action request regarding the data table;

successively execute, in a case where the data processing request is a data insertion action request regarding the data table, hash and encryption actions on inserted data, and store encrypted data in an encrypted permanent hash table; and generate, in a case where the data processing request is a data modification action request regarding the data table or a data deletion action request regarding the data table, an instruction for prohibiting data modification or data deletion.

In an exemplary embodiment, the computer instruction, when being executed by the at least one processor 41, causes the at least one processor 41 to:

perform hash calculation on the inserted data, and store a hash value obtained by the hash calculation in a per-manent, hash table; and perform security attribute identification calculation on the hash value obtained by the hash calculation, append a time stamp value after the hash value, generate an encrypted hash value, and store the encrypted hash value in the encrypted permanent hash table.

In an exemplary embodiment, the computer instruction, when being executed by the at least one processor 41, causes the at least one processor 41 to:

successively calculate hash values or data elements of the data table;

perform hash calculation on an entirety of the data elements of the data table after the hash calculation to obtain a hash value corresponding to the inserted data; and store the hash value obtained by the hash calculation in the permanent hash table.

In an exemplary embodiment, the data elements of the data table comprise a database name, a user name, a table, a row Identifier (ID), a field name, a field value and an insertion time.

In an exemplary embodiment; the computer instruction, when being executed by the at least one processor 41, causes the at least one processor 41 to:

successively calculate hash values or data elements of the data table;

perform hash calculation on an entirety of the data elements of the data table after the hash calculation to obtain a hash value corresponding to modified data, and store the hash value corresponding to the modified data in a temporary hash table;

determine a row position of the modified data in the data table;

decrypt a hash value at the determined row position in the encrypted permanent hash table to obtain a permanent hash value;

compare the hash value stored in the temporary hash table with the permanent hash value obtained by decryption, and determine whether the hash value stored in the temporary hash table is consistent with the permanent hash value obtained by decryption;

generate, in a case where it is determined that the hash value stored in the temporary hash table is consistent with the permanent hash value obtained by decryption, the instruction for prohibiting data modification; and also generate, in a case where it is determined that the hash value stored in the temporary hash table is not consistent with the permanent hash value obtained by decryption, the instruction for prohibiting data modification.

In an exemplary embodiment, the data elements of the data table comprise a database name, a user name, a table, a row Identifier (ID), a field name, a field value and a modification time.

In an exemplary embodiment; the computer instruction, when being executed by the at least one processor 41; causes the at least one processor 41 to:

successively calculate hash values of data elements of the data table;

perform hash calculation on an entirety of the data elements of the data table after the hash calculation to obtain a hash value corresponding to deleted data, and store the hash value corresponding to the deleted data in the temporary hash table, wherein the hash value obtained by the hash calculation is null;

determine a position of the deleted data in the data table;

decrypt a hash value at the determined position in the encrypted permanent hash table to obtain a permanent hash value;

compare the hash value stored in the temporary hash table with the permanent hash value obtained by decryption; and generate the instruction for prohibiting data deletion according to a comparison result.

In an exemplary embodiment; the data elements of the data table comprise a database name, a user name, a table, a row Identifier (ID), a field name, a field value and a deletion time.

In another embodiment; a non-transitory computer-readable storage medium is provided; which stores a computer program, wherein the computer program, when being executed by at least one processor, causes the at least one processor to implement operations of the method in the above embodiments.

For details of the non-transitory computer-readable storage medium, reference could be made to the previously described embodiments. For the data security realization method based on a K-DB database, and the details will not be repeated herein.

In the embodiments of the present disclosure, the data processing request of the user regarding the data table in the database is received; in a case where the data processing request is the data insertion action request regarding the data table, hash and encryption actions are successively executed on the inserted data, and the encrypted data is stored in the encrypted permanent hash table; in a case where the data processing request is a data modification action request regarding the data table or a data deletion action request regarding the data table, the instruction for prohibiting data modification or data deletion is generated. Therefore, the flow of prohibiting data modification and data deletion regarding the data table is optimized, and the hash value is encrypted, so that the function is more secure and strong.

The above embodiments are only intended to illustrate the technical solutions of the present disclosure, but not intended to limit the present disclosure. Although the present disclosure is described in detail with reference to the foregoing embodiments, it should be understood by those having ordinary skill in the art that they may still make modifications to the technical solutions described in the foregoing embodiments or equivalent replacements to part or all of the technical Features without any modification of the technical solutions or departures from the scope of the technical solutions of the embodiments of the disclosure, which should be included within the scope of protection of the disclosure.

What is claimed is:

1. A data security realization method based on a K-DB database, comprising:

receiving a data processing request of a user regarding a data table in a database, wherein the data processing request regarding the data table comprises a data insertion action request regarding the data table, a data modification action request regarding the data table, and a data deletion action request regarding the data table;

successively executing, in a case where the data processing request is a data insertion action request regarding the data table, hash and encryption actions on inserted data, and storing encrypted data in an encrypted permanent hash table; and generating, in a case where the data processing request is a data modification action request regarding the data table or a data deletion action request regarding the data table, an instruction for prohibiting data modification or data deletion, wherein successively executing, in a case where the data processing request is a data insertion action request regarding the data table, hash and encryption actions on inserted data, and storing encrypted data in an encrypted permanent hash table comprises:

performing hash calculation on the inserted data, and storing a hash value obtained by the hash calculation in a permanent hash table; and performing security attribute identification calculation on the hash value obtained by the hash calculation, appending a time stamp value after the hash value, generating n encrypted hash value, and storing the encrypted hash value in the encrypted permanent hash table;

wherein generating, in a case where the data processing request is a data modification action request regarding the data table, an instruction for prohibiting data modification comprises:

successively calculating hash values of data elements of the data table;

performing hash calculation on an entirety of the data elements of the data table after the hash calculation to obtain a hash value corresponding to modified data, and storing the hash value corresponding to the modified data in a temporary hash table;

determining a row position of the modified data in the data table, and decrypting a hash value at the determined row position in the encrypted permanent hash table to obtain a permanent hash value;

comparing the hash value stored in the temporary hash table with the permanent hash value obtained by decryption, and determining whether the hash value stored in the temporary hash table is consist with the permanent hash value obtained by decryption;

in a case where it is determined that the hash value stored in the temporary hash table is consistent with the permanent hash value obtained by decryption, generating the instruction for prohibiting data modification, and in a case where it is determined that the hash value stored in the temporary hash table is not consistent with the permanent hash value obtained by decryption, also generating the instruction for prohibiting data modification.

2. The data security realization method based on the K-DB database according to claim 1, wherein performing hash calculation on the inserted data and storing a hash value obtained by the hash calculation in a permanent hash table comprises:

successively calculating hash values of data elements of the data table;

performing hash calculation on an entirety of the data elements of the data table after the hash calculation to obtain a hash value corresponding to the inserted data; and storing the hash value obtained by the hash calculation in the permanent hash table.

3. The data security realization method based on the K-DB database according to claim 1, wherein generating, in a case where the data processing request is a data deletion action request regarding the data table, an instruction for prohibiting data deletion comprises:

successively calculating hash values of data elements of the data table;

performing hash calculation on an entirety of the data elements of the data table after the hash calculation to obtain a hash value corresponding to deleted data, and storing the hash value corresponding to the deleted data in the temporary hash table, wherein the hash value obtained by the hash calculation is null;

determining a position of the deleted data in the data table, and decrypting a hash value at the determined position in the encrypted permanent hash table to obtain a permanent hash value;

comparing the hash value stored in the temporary hash table with the permanent hash value obtained by decryption; and generating the instruction for prohibiting data deletion according to a comparison result.

4. A data security realization system based on a K-DB database, comprising a memory storing instructions and a processor in communication with the memory, wherein the processor is configured to execute the instructions to:

receive a data processing request of a user regarding a data table in a database, wherein the data processing request regarding the data table comprises a data insertion action request regarding the data table, a data modification action request regarding the data table, and a data deletion action request regarding the data table;

successively execute, in a case where the data processing request is a data insertion action request regarding the data table, hash and encryption actions on inserted data, and store encrypted data in an encrypted permanent hash table; and generate, in a case where the data processing request is a data modification action request regarding the data table or a data deletion action request regarding the data table, an instruction for prohibiting data modification or data deletion;

wherein the processor configured to execute the instructions to:

perform hash calculation on the inserted data, and store a hash value obtained by the hash calculation in a permanent hash table; and perform security attribute identification calculation on the hash value obtained by the hash calculation, append a time stamp value after the hash value, generate an encrypted hash value, and store the encrypted hash value in the encrypted permanent hash table;

wherein the processor is configured to execute the instructions to:

successively calculate hash values of data elements of the data table;

perform hash calculation on an entirety of the data elements of the data table after the hash calculation to obtain a hash value corresponding to modified data and store the hash value corresponding to the modified data in a temporary hash table;

determine a row position of the modified data in the data table;

decrypt a hash value at the determined row position in the encrypted permanent hash table to obtain a permanent hash value;

compare the hash value stored in the temporary bash table with the permanent hash value obtained by decryption, and determine whether the hash value stored in the temporary hash table is consistent with the permanent hash value obtained by decryption;

generate, in a case where it is determined that the hash value stored in the temporary hash table is consistent with the permanent hash value obtained by decryption, the instruction for prohibiting data modification; and also generate, in a case where it is determined that the hash value stored in the temporary hash table is not consistent with the permanent hash value obtained by decryption, the instruction for prohibiting data modification.

5. The data security realization system based on the K-DB database according to claim 4, wherein the processor is configured to execute the instructions to:

successively calculate hash values of data elements of the data table;

perform hash calculation on an entirety of the data elements of the data table after the hash calculation to obtain a hash value corresponding to the inserted data; and store the hash value obtained by the hash calculation in the permanent hash table.

6. The data security realization system based on the K-DB database according to claim 4, wherein the processor is configured to execute the instructions to:

successively calculate hash values of data elements of the data table;

perform hash calculation on an entirety of the data elements of the data table after the hash calculation to obtain a hash value corresponding to deleted data, and store the hash value corresponding to the deleted data in the temporary hash table, wherein the hash value obtained by the hash calculation is null;

determine a position of the deleted data in the data table;

decrypt a hash value at the determined position in the encrypted permanent hash table to obtain a permanent hash value;

compare the hash value stored in the temporary hash table with the permanent hash value obtained by decryption; and generate the instruction for prohibiting data deletion according to a comparison result.

7. The data security realization method based on the K-DB database according to claim 2, wherein the data elements of the data table comprise a database name, a user name, a table, a row Identifier (ID), a field name, a field value and an insertion time.

8. The data security realization method based on the K-DB database according to claim 1, wherein the data elements of the data table comprise a database name, a user name, a table, a row Identifier (ID), a field name, a field value and a modification time.

9. The data security realization method based on the K-DB database according to claim 3, wherein the data elements of the data table comprise a database name, a user name, a table, a row Identifier (ID), a field name, a field value and a deletion time.

10. The data security realization system based on the K-DB database according to claim 5, wherein the data elements of the data table comprise a database name, a user name, a table, a row Identifier (ID), a field name, a field value and an insertion time.

11. The data security realization method based on the K-DB database according to claim 4, wherein the data elements of the data table comprise a database name, a user name, a table, a row Identifier (ID), a field name, a field value and a modification time.

12. The data security realization method based on the K-DB database according to claim 6, wherein the data elements of the data table comprise a database name, a user name, a table, a row Identifier (ID), a field name, a field value and a deletion time.

13. A non-transitory computer-readable storage medium, storing a computer program, wherein the computer program, when being executed by at least one processor, causes the at least one processor to:

receive a data processing request of a user regarding a data table in a database, wherein the data processing request regarding the data table comprises a data insertion action request regarding the data table, a data modification action request regarding the data table, and a data deletion action request regarding the data table;

successively execute, in a case where the data processing request is a data insertion action request regarding the data table, hash and encryption actions on inserted data, and store encrypted data in an encrypted permanent hash table; and generate, in a case where the data processing request is a data modification action request regarding the data table or a data deletion action request regarding the data table, an instruction for prohibiting data modification or data deletion;

wherein the computer program, when being executed by at least one processor, causes the at least one processor to:

perform hash calculation on the inserted data, and store a hash value obtained by the hash calculation in a permanent hash table; and perform security attribute identification calculation on the hash value obtained by the hash calculation, append a time stamp value after the hash value, generate an encrypted hash value, and store the encrypted hash value in the encrypted permanent hash table;

wherein the computer program, when being executed by at least one processor, causes the at least one processor to:

successively calculate hash values of data elements of the data table;

perform hash calculation on an entirety of the data elements of the data table after the hash calculation to obtain a hash value corresponding to modified data and store the hash value corresponding to the modified data in a temporary hash table, determine a row position of the modified data in the data table;

decrypt a hash value at the determined row position in the encrypted permanent hash table to obtain a permanent hash value;

compare the hash value stored in the temporary bash table with the permanent hash value obtained by decryption, and determine whether the hash value stored in the temporary hash table is consistent with the permanent hash value obtained by decryption;

generate, in a case where it is determined that the hash value stored in the temporary hash table is consistent with the permanent hash value obtained by decryption, the instruction for prohibiting data modification; and also generate, in a case where it is determined that the hash value stored in the temporary hash table is not consistent with the permanent hash value obtained by decryption, the instruction for prohibiting data modification.

14. The non-transitory computer-readable storage medium according to claim 13 wherein the computer program, when being executed by at least one processor, causes the at least one processor to:

successively calculate hash values of data elements of the data table;

perform hash calculation on an entirety of the data elements of the data table after the hash calculation to obtain a hash value corresponding to the inserted data; and store the hash value obtained by the hash calculation in the permanent hash table.

* * * * *